March 3, 1953  R. R. ALLEN  2,630,173
METHOD AND APPARATUS FOR CUTTING MATERIALS
Filed June 5, 1948  4 Sheets-Sheet 1

INVENTOR.
Robert R. Allen
BY
Benj. T. Rauber
ATTORNEY

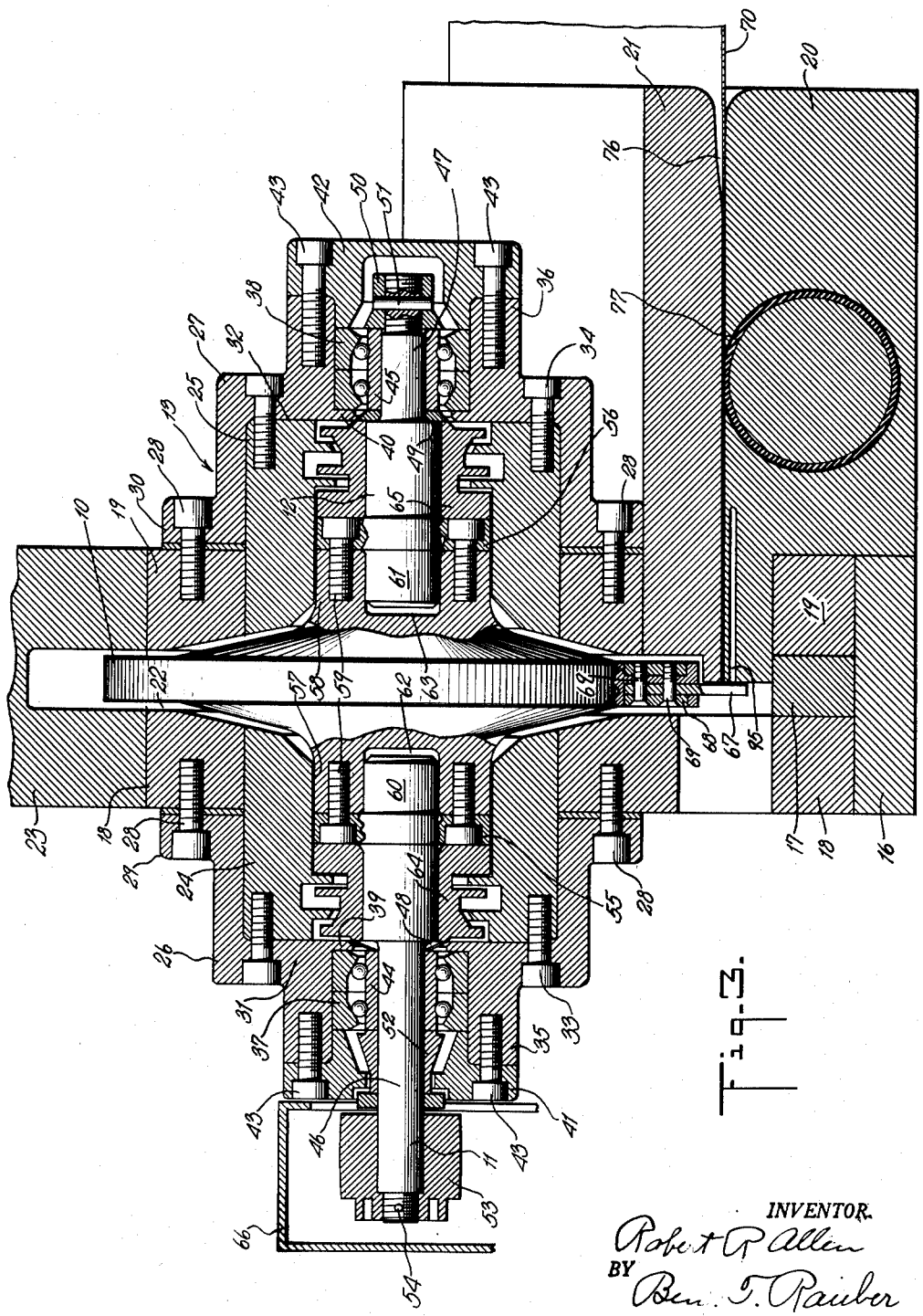

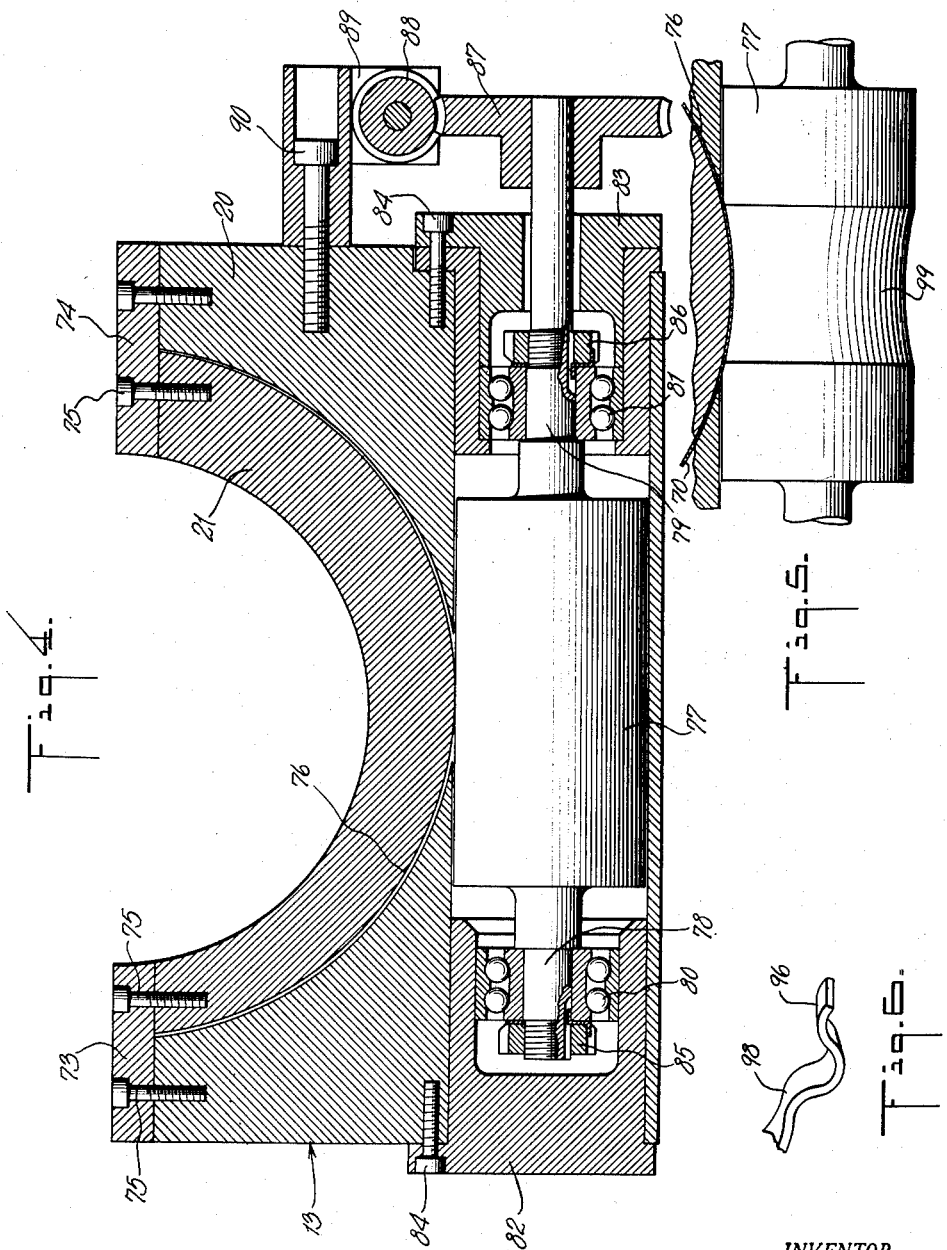

March 3, 1953 R. R. ALLEN 2,630,173
METHOD AND APPARATUS FOR CUTTING MATERIALS
Filed June 5, 1948 4 Sheets-Sheet 4
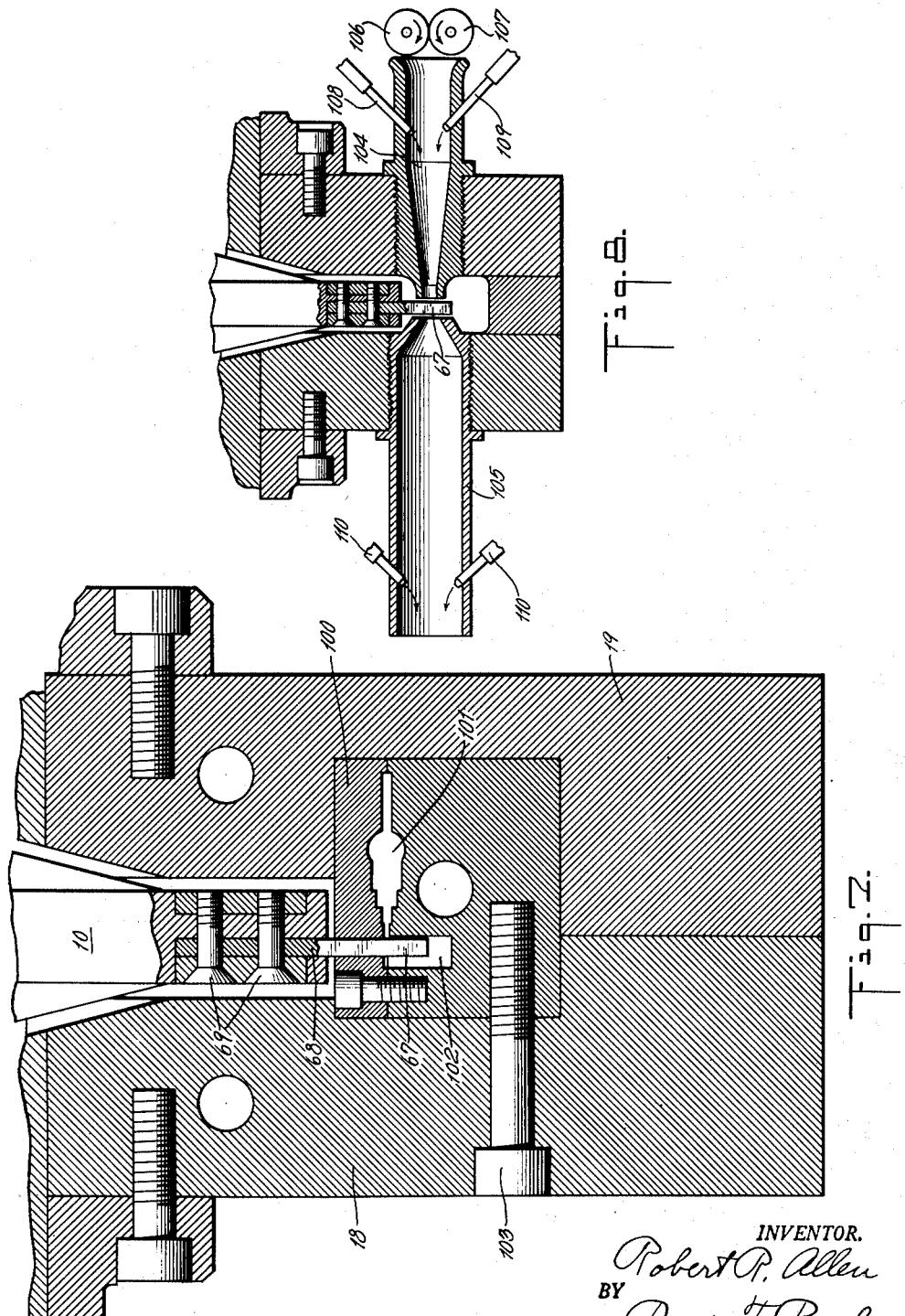
INVENTOR.
Robert R. Allen
BY
Benj. F. Rauber
ATTORNEY Patented Mar. 3, 1953

2,630,173

UNITED STATES PATENT OFFICE 2,630,173

METHOD AND APPARATUS FOR CUTTING MATERIALS

Robert R. Allen, Arlington, N. J., assignor to Custom Scientific Instruments, Inc., Arlington, N. J., a corporation of New Jersey Application June 5, 1948, Serial No. 31,257

6 Claims. (Cl. 164—17)

My present invention relates to a method and apparatus for cutting various materials, such as foil, filaments and strips, for various purposes, such as obtaining segments of small dimensions or of precise accuracy or both. The invention also comprises certain novel products.

Heretofore articles have been cut either by pressure applied through a sharpened edge which indented and thereby cut through the material, or by a shearing action applying pressure on opposite sides of the article to be cut. This method of cutting distorted the material adjacent the cut. Such distortion is not objectionable for many purposes, but may be objectionable where the material is to be cut into very fine or narrow segments, or where an undistorted, accurate, edge is desired.

My present invention provides a method and apparatus whereby cutting of various materials may be accomplished without distortion and with production of very uniform accurate edges.

In my present invention the cutting is accomplished by the passage of the cutting edge of a blade at a very high speed. The speed at which the cutting edge moves may be in the range from several hundred feet per second to above 1000 feet per second. For example it may range from 700 or 800 feet per second to 1200 to 1400 feet per second or even greater. At these speeds the cutting action does not depend upon pressure nor upon a shearing action to sever the material, but upon the impact, at these high speeds, of the cutting edge. Consequently there is no perceptible distortion of the cutting edge, such as bent or roughened or indented edges obtained by the application of pressure or shearing force. The invention, therefore, provides products having edges which are sharp and uniform and devoid of abraded or torn effects even when viewed under a high powered microscope, and even when the material being cut is very thin as, for example, less than 0.001".

In my present invention the cutting blade is moved at a suitable speed, being mounted on a rotor rotating at a high rate of speed. For example a cutting blade may be mounted to project radially from the edge of a disc rotating at a speed of upwards of 45,000 R. P. M. With a disc of a diameter of about four inches, as described more fully in my co-pending application Ser. No. 743,335, filed April 23, 1947, now Patent No. 2,461,621, this would provide a blade speed of 800 feet per second. Speeds of 60,000 to 70,000 R. P. M. which are readily attainable by the apparatus of my invention, would provide speeds over 1000 feet per second. The rotor may be rotated as high as 120,000 R. P. M. As the speed approaches this amount, however, the danger of breakage by centrifugal force becomes imminent and inasmuch as lower speeds are sufficient it is preferable to use speeds ranging from 45,000 to 70,000 R. P. M.

The material to be cut may be fed to the blade in a direction transverse to the path of the blade at any desired rate of feed. If a thin sheet of foil is fed in a direction transverse to the path of the blade it will be cut into thin strips. A foil of a thickness of 0.0005" fed into the path of the blades may be cut into filament-like strips of a width of 0.001" or less, having square edges free from irregularities even when viewed under magnification. Foil fed in this direction may be of any length desired. If a strip of material is fed in a direction parallel to the plane of travel of the blades but intersecting their path of travel, it will be cut to provide an accurately formed uniform edge even though the material may be of a resilient nature, such as rubber.

The various features of my invention are illustrated, by way of example, in the accompanying drawings in which Fig. 1 is a plan of the apparatus embodying a preferred form of the invention;

Fig. 3 is a vertical sectional view taken through the axis of the rotor and of means for feeding a sheet transversely to the direction of travel of the blades;

Fig. 4 is a sectional view taken at right angles to that of Fig. 3 through the sheet feeding mechanism;

Fig. 5 is a part section of a modified form of sheet feeding element;

Fig. 6 is a perspective view on a greatly magnified scale of a square edged filament cut from foil by the apparatus of Figs. 1 to 5;

Fig. 7 is a sectional view of a modification for feeding a strip, such as a wind shield wiper blade, in a direction parallel to the path of the blade;

Fig. 8 is a modification showing means for feeding a strand or group of filaments transversely through the path of the blades.

Figure 1:
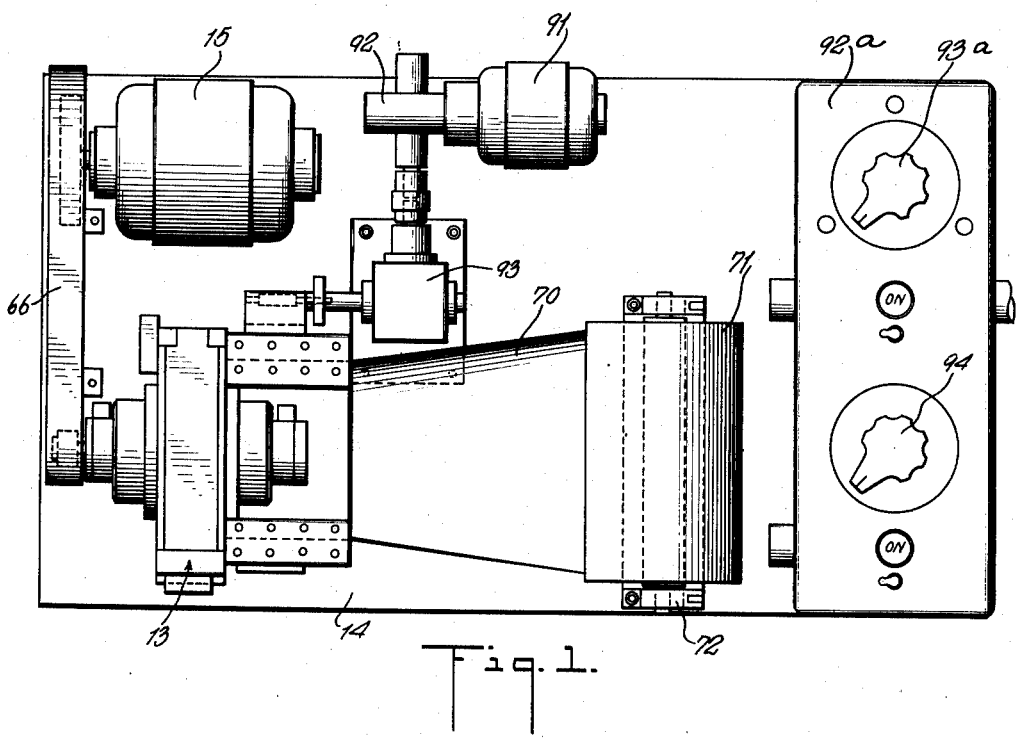
Figure 2:
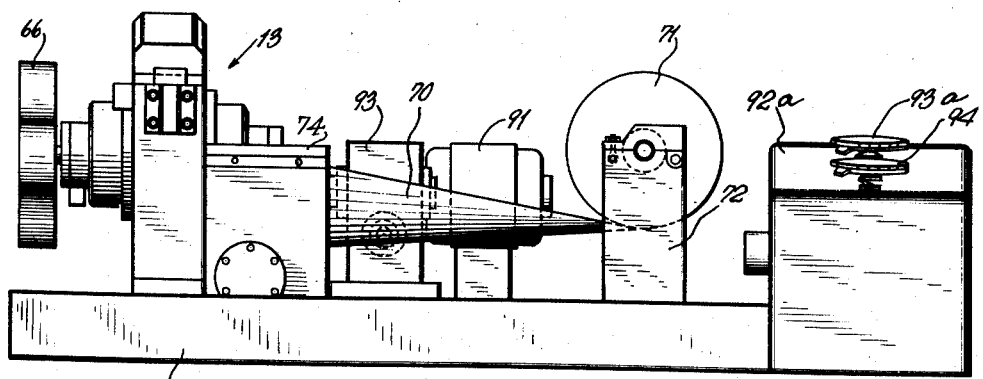
Fig. 2 is a side view of the apparatus shown in Fig. 1.

Referring more particularly to the embodiment of the invention as shown in Figs. 1-5 inclusive, a rotor 10, Fig. 3 (such as described in my co-pending application Ser. No. 743,335, now Patent No. 2,461,621) is mounted on and between a pair of aligned supporting shafts 11 and 12 to rotate in a suitable housing 13 which may be mounted on a base 14 on which is also mounted a driving motor 15 for the shaft 11. The housing 13 is formed or built up from a number of accurately fitting elements. These parts comprise a plate 16 resting directly on the base 14 and supporting a central spacing plate 17 and a pair of side walls 18 and 19. A lower feeding and guide element 20 is also mounted on the base 14 and complementary thereto an upper guide plate 21. Between the two side walls 18 and 19 is a space 22 in which the rotor 10 rotates. The space 22 is closed by a cover 23 of heavy construction. The rotor and cutting blade rotate in this space without contact with its walls which, at the high speed of the blade, would be destructive. The foil is cut while passing through this space without support.

Mounted in a transverse opening to the walls 18 and 19 are a pair of complementary collars 24 and 25, the inner or closed faces of which are closely spaced from the sides of the rotor 10. The collars 24 and 25 are held in position by stepped flanged rings 26 and 27 secured to the side walls 18 and 19 by screws 28 passing through openings in flanges 29 and 30 of the rings 26 and 27 and threaded into suitable openings in the side walls 18 and 19. The rings 26 and 27 have inwardly extending flanges or shoulders 31 and 32 which abut against the ends of the collars 24 and 25 securing same in position by means of screws 33 and 34. Outwardly axial extensions 35 and 36 of the rings 26 and 27 serve to support the outer raceways 37 and 38 of ball bearings. The raceways 37 and 38 are held in place against shoulders 39 and 40 of the extensions 35 and 36 by means of caps 41 and 42 respectively which abut the ends of the raceways and are secured to the extensions by means of screws 43 threaded therein.

Inner raceways 44 and 45 of the ball bearings are mounted on reduced extensions 46 and 47 of the shafts 11 and 12 and are held against spacing rings 48 and 49 abutting shoulders on the respective shafts by suitable retaining means. The retaining means for the raceway 45 comprises a nut 50 screwed onto a reduced end of the extension 47 and secured by a cross pin 51. The nut 50 is received in a recess in the cap 42. Similarly the raceway 44 is retained by a collar 52 through which the shaft extends and which is in turn held by a pulley 53 which is screwed onto the shaft and retained by a pin 54. A spring retaining means may be mounted between the end of the pulley and the opposite end of the collar 52 to retain the parts against vibration.

The shafts 11 and 12 are provided with outwardly extending flanges 55 and 56 which abut hubs 57 and 58 of the rotor 10 and are secured thereto by means of screws 59. The inner ends of the shafts extend beyond the flanges 55 and 56 at 60 and 61 and are received in and tightly fit recesses 62 and 63 in the hubs 57 and 58. In this manner the two shafts 11 and 12 are securely mounted in a unitary structure with the rotor 10. Suitable lubricating means are provided for the ball bearings supporting the roller. The centrifugal force of the shaft rotating at high speeds would tend to carry this lubrication into the space 22 in which the rotor rotates. To prevent this transfer or flow of lubricating fluid labyrinth blocks 64 and 65 are provided on the shafts 11 and 12 between the ball bearings and the flanges 55 and 56 respectively. These blocks have circular spaced projecting flanges and recesses which are interleaved with corresponding recesses and oppositely projecting flanges on the inner surfaces of the rings 24 and 25 so that they may rotate freely therein. Consequently lubricant reaching the blocks is thrown outwardly by centrifugal force and cannot reach the rotor 10 or the space 22 but drains back to the oil supply through suitable return drains, not shown.

The shafts 11 and 12 and rotor 10 are driven from the motor 15 by a belt to the pulley 53. A suitable guard 66 is provided for the belt and pulley. The motor and transmission are so designed as to give the requisite speed to the shaft and rotor.

A cutting blade 67 is mounted on the rotor 10 to project freely from the periphery thereof, the blade being mounted in a recess in the rotor and retained therein by a clamping plate 68 and a pair of screws 69 as described in my co-pending application Ser. No. 743,335, now Patent No. 2,461,621.

The cutting blade rotates in the recess 22 at the very high speeds imparted by the rotor as, for example, at speeds of 800 feet per second to 1200 feet per second. The material to be cut is fed into the path of the blade 67. It will be understood that the rotor 10 and blade 67 are balanced as a unit to avoid vibration.

In the embodiment shown in Figs. 1–5 inclusive, a thin foil 70 of any suitable metal as, for example, aluminum or aluminum alloy, is drawn from a roll 71 rotatably mounted on suitable supports 72 on the base 14 and fed between the guides 20—21 into the path of the blade 67. As shown more particularly in Figs. 3 and 4, the guiding surface of the lower guide member 20 is of a part cylindrical curvature corresponding to the path of the blade 67, and similarly the lower surface of the guide member 21 is of a complementary curvature and is separated therefrom by top plates 73 and 74 secured to the guides by screws 75, Fig. 4, to provide a thin slot 76 of a substantially semi-cylindrical curvature through which the foil is fed. Preferably the axis of the slot 76 is slightly offset laterally or vertically from the axis of the rotor 10 so that the point of intersection of the foil and blade will move radially during the cutting. The foil is drawn from the roll 71 and into and through the slot 76 by means of a roller 77 approximately tangent to the curvature of the slot 76. The roller preferably has a surface of relatively high coefficient of friction as, for example, being covered with rubber and, therefore, draws and pushes the foil through the narrow guide slot 76.

The roller 77 is contained in a cylindrical recess in the guide block 20. It has trunnions 78 and 79 at its ends which are mounted in ball bearings 80 and 81 respectively, journalled in bearing blocks 82 and 83 fitted into the ends of the cylindrical recess containing the roller 77 and secured therein by screws 84. The roller 77 may be retained in the inner raceways of the bearings 80 and 81 by means of nuts 85 and 86. The trunnion 79 extends outwardly through the end of the bearing block 83 and has secured on its free end a gear wheel 87 which meshes with a worm 88 mounted in a bracket 89 secured to the lower guide member 20 by means of a screw 90. The worm 88 in turn is driven from a motor 91, Fig. 1, through gear reduction elements 92 and 93. The motor 91 may be a variable speed motor so that the rate of feed of the foil into the path of the cutting blade 67 may be controlled to provide any desired width of cut.

For example, if a foil of 0.005″ in thickness is to be cut into cuts of 0.001″ in width and with the rotor rotating at 1000 R. P. S., the speed of the motor 91 would be such as to drive the foil at the rate of one inch per second, thus providing 1000 strips of foil per second. By varying the speeds of the motors 15 and 91, therefore, as, for example, through a suitable control box 92ª and control knobs 93ª and 94, rectangular filaments of any desired dimensions may be obtained. Generally, however, filaments of a thickness up to about 0.008" may be cut on the present apparatus. In order to prevent the accumulation or piling up of filaments in the path of the blade, a duct 95 is provided in the guide block 20 to supply compressed air to blow the filaments out of the path of the blade.

An example of the filaments produced by my present invention is shown in Fig. 6. As shown therein the cross-section of the filaments 96 is rectangular having edges 98 which are smooth and undistorted. The filament may be wavy or kinked, as indicated, and the amount of this kinking may be controlled by the angularity of the cutting edge of the blade. In this way the waviness of the filaments may be adjusted for each purpose as, for example, weaving or felting, or to provide a maximum surface for chemical action, such as oxidation or combustion or for abrasive effects.

To increase the tractive effect of the roller 77 it may be provided with a recess 99 corresponding to the curvature of the guide 76 and thus contact on a small arc of the foil rather than tangentially as in Fig. 4.

It will be understood that in passing from the roll 71 to and through the guiding slot 76 the foil will assume a semi-cylindrical shape so that the blade 67 passes through one edge of the foil to the other with a true cutting action rather than by transverse shearing.

Instead of passing a material in a direction transverse to the path of the blade, a strip of material as, for example, a windshield wiper blade, may be passed in a direction parallel to a tangent of the path of the blade so as to trim off an edge of the strip. Such an arrangement is shown in Fig. 7. In this modification the two halves 18 and 19 of the rotor and blade housing are provided with a guide block 100 having a guiding slot 101, the edge of which intersects the path of the blade. As the strip passes lengthwise through the guiding slot 101, with an edge projecting into the path of the blade, a longitudinal cut is made. The strip will be fed through the guide 101 at such a rate of speed that successive cuts will be made lengthwise of the strip so as to provide a smooth edge which, owing to the high speed of the blade, is undistorted and free from waviness or inaccuracies. Cuttings from the strip are received in a slot 102 from which they may be blown or removed by any suitable means. The guiding block 101 may be secured in the housing 18 by means of suitable screws 103.

Instead of feeding a filament transversely across the path of the blade, as in Figs. 1–5 inclusive, a group or bundle of filaments may be fed transversely and cut into lengths of any selected dimension. For this purpose a guiding tube 104, Fig. 8, is mounted at one side of the path of the blade and a receiving tube 105 at the opposite side. A group of filaments may be fed into the guiding tube 104 by means of a pair of rollers 106 and 107. The filaments are then blown forwardly through the tube by means of air jets 108 and 109 so that they stream forward into the path of the blade. Projector air jets 110 in the off-take tube 105 serve to draw the severed filaments free from the path of the blade 67.

The cover 23 is of heavy construction and is preferably provided with a switch controlling the motor 15 which is open to prevent rotation of the switch when the cover is lifted.

The above invention, therefore, provides a novel filamentary material, and also provides a method and apparatus whereby materials, such as strips and filaments and thin sheets, may be cut with great accuracy and without distortion of the edge of the cuttings, such as is obtained by shearing or by the application of pressure to a cutting edge.

Having described my invention, what I claim is:

1. A method of cutting material which comprises feeding a sheet of material in circular transverse curvature and rotating a cutting blade transversely in the path of said sheet from one side edge of said sheet to the other, said material being unsupported at the plane of cutting.

2. Apparatus for cutting sheet material which comprises a rotor, a cutting blade mounted on said rotor and projecting radially therefrom, a guide slot extending toward but short of contact with the path of said blade and of a transverse partly circular curvature intersecting the path of said blade and a roller having its surface projecting into said guide slot and rotating on an axis transverse to said slot.

3. Apparatus for cutting sheet material which comprises a rotor, a cutting blade mounted on said rotor and projecting radially therefrom, a guide slot extending toward but short of contact with the path of said blade and of a transverse partly circular curvature having its axis offset slightly sidewise of that of said rotor and a roller having its surface projecting into said guide slot and rotating on an axis transverse to said slot, and means to rotate said rotor and said roller at independently controlled speeds.

4. Apparatus for cutting sheet material which comprises a rotor, a cutting blade mounted on said rotor and projecting radially therefrom, a guide slot extending toward but short of contact with the path of said blade and of a transverse partly circular curvature having its axis offset slightly sidewise of that of said rotor and a roller having its surface projecting into said guide slot and rotating on an axis transverse to said slot and air channels projecting across the path of said blades adjacent to said guide slot.

5. Apparatus for cutting sheet material which comprises a rotor, a cutting blade mounted on said rotor and projecting radially therefrom, a guide slot extending toward but short of contact with the path of said blade and of a transverse partly circular curvature having its axis offset slightly sidewise of that of said rotor and a roller having its surface projecting into said guide slot and rotating on an axis transverse to said slot, an enclosure for said rotor and an exhaust opening through said enclosure at the opposite side of said blade path.

6. The apparatus of claim 2 in which said roller has a circular curve conforming to the curvature of said slot.

ROBERT R. ALLEN.

(References on following page)

References Cited

The following references are of record in the file of this patent:

UNITED STATES PATENTS

| Number | Name | Date |
|---|---|---|
| 1,118,255 | Akim | Nov. 24, 1914 |
| 1,646,396 | Fidd | Oct. 25, 1927 |
| 1,651,096 | Molins | Nov. 29, 1927 |
| 1,938,787 | Abbott | Dec. 12, 1933 |
| 1,978,826 | Walton | Oct. 30, 1934 |
| 2,158,790 | Arthur | May 16, 1939 |
| 2,217,766 | Neff | Oct. 15, 1940 |
| 2,226,130 | Kinsella | Dec. 24, 1940 |
| 2,296,298 | Spalding | Sept. 22, 1942 |
| 2,305,312 | Kern | Dec. 15, 1942 |
| 2,331,230 | Rippl | Oct. 5, 1943 |
| 2,343,887 | Crane | Mar. 14, 1944 |
| 2,347,046 | Geiger | Apr. 18, 1944 |
| 2,391,719 | Llewellyn | Dec. 25, 1945 |

FOREIGN PATENTS

| Number | Country | Date |
|---|---|---|
| 605,280 | Great Britain | July 20, 1948 |
| 645,761 | Germany | June 2, 1937 |